United States Patent [19]

Hahn et al.

[11] Patent Number: 4,990,540

[45] Date of Patent: Feb. 5, 1991

[54] EXPANDABLE STYRENE POLYMER OF HIGH OIL RESISTANCE AND PREPARATION THEREOF

[75] Inventors: Klaus Hahn, Kirchheim; Uwe Guhr, Gruenstadt; Hans Hintz, Ludwigshafen; Roland Gellert, Neustadt, all of Fed. Rep. of Germany

[73] Assignee: BASF Aktiengesellschaft, Ludwigshafen, Fed. Rep. of Germany

[21] Appl. No.: 451,773

[22] Filed: Dec. 18, 1989

[30] Foreign Application Priority Data

Jan. 18, 1989 [DE] Fed. Rep. of Germany ....... 3901329

[51] Int. Cl.$^5$ .............................. C08J 9/18; C08J 9/20
[52] U.S. Cl. ........................................ 521/56; 521/59; 521/60; 521/139
[58] Field of Search ....................... 521/56, 59, 60, 139

[56] References Cited

U.S. PATENT DOCUMENTS

| | | | |
|---|---|---|---|
| 4,497,912 | 2/1985 | Reese et al. | 521/139 |
| 4,663,357 | 5/1987 | Meyer et al. | 521/139 |
| 4,812,484 | 3/1989 | Endo et al. | 521/139 |

*Primary Examiner*—Morton Foelak
*Attorney, Agent, or Firm*—Oblon, Spivak, McClelland, Maier & Neustadt

[57] ABSTRACT

Expandable styrene polymers formed from 50 to 83% by weight of polystyrene and from 17 to 50% by weight of styrene-soluble styreneacrylonitrile copolymer having a total acrylonitrile content of not less than 5% by weight, containing from 3 to 10% by weight of a $C_3$-$C_6$-hydrocarbon with or without customary additives, are notable for high oil resistance and can be prepared by suspension polymerization of a solution of the styrene-acrylonitrile copolymer in styrene.

3 Claims, No Drawings

EXPANDABLE STYRENE POLYMER OF HIGH OIL RESISTANCE AND PREPARATION THEREOF

Foams based on styrene-acrylonitrile copolymers have become industrially important because of their high oil resistance. They are prepared by polymerizing a mixture of styrene and acrylonitrile in aqueous suspension in the presence of a blowing agent. The resulting expandable copolymer can be blown up by heating to form foam beads and be further processed into foam articles of any desired shape by welding.

Owing to the high toxicity of acrylonitrile, the suspension polymerization presents particular dangers. Another problem is the disposal of the acrylonitrile-containing wastewater.

It is an object of the present invention to prepare an expandable styrene polymer of high oil resistance by a safe and environmentally friendly process which does not give rise to toxic wastewaters.

We have found, surprisingly, that this object is achieved by preparing an expandable styrene polymer of high oil resistance from a mixture of polystyrene and a styrene-soluble styrene-acrylonitrile copolymer in a simple and safe manner by suspension polymerization in styrene.

It was not foreseeable by the person skilled in the art that such a product would show oil resistance, since polystyrene, the main component, is not oil-resistant.

The present invention accordingly provides an expandable styrene polymer of high oil resistance, containing (a) up to 83% by weight of polystyrene, (b) from 17 to 50% by weight of a styrene-soluble styrene-acrylonitrile copolymer in which the level of acrylonitrile is not less than 5% by weight, based on the sum of (a) and (b), (c) from 3 to 10% by weight, based on the sum of (a) and (b), of a $C_3$–$C_6$-hydrocarbon as blowing agent, and optionally (d) customary additives in effective amounts.

Main component (a) of the product is polystyrene in an amount of from 50 to 83% by weight, preferably from 60 to 80% by weight, based on the sum of (a) and (b). Advantageously, the polystyrene contains as copolymerized units a small amount of a crosslinking agent, ie. a compound having more than one, preferably two, polymerizable double bonds, such as divinylbenzene, butadiene or butanediol diacrylate. The crosslinking agent is in general used in an amount of from 0.005 to 0.05 mol-%, based on styrene.

Further component b) of the product is a styrenesoluble styrene-acrylonitrile copolymer in an amount of from 17 to 50% by weight, preferably from 20 to 40% by weight, based on the sum of a) and b). The copolymer in general contains acrylonitrile as copolymerized units in an amount of about 15–35% by weight, in particular 20–30% by weight. If the acrylonitrile content is too high, the copolymer will no longer be soluble in styrene.

Component (b) is selected by amount and acrylonitrile content in such a way that the level of copolymerized acrylonitrile units, based on the sum of (a) and (b), is not less than 5% by weight, in general from 5 to 17% by weight, preferably from 5 to 10% by weight. The copolymer has in general a melt flow index (MFI) of from 0.5 to 2.5, preferably from 1.5 to 2.0, g/10 min as measured by German Standard Specification DIN 53735. With no blowing agent present, the mixture of polystyrene and styrene-acrylonitrile copolymer has in general a melt flow index (MFI) of from 1.0 to 2.2, preferably from 1.5 to 2.0, g/10 min as measured by German Standard Specification DIN 53735.

The customary blowing agent component of the expandable styrene polymer comprises from 3 to 10% by weight, preferably from 5 to 8% by weight, based on the sum of (a) and (b), of a $C_3$-to $C_6$-hydrocarbon, such as propane, butane, isobutane, n-pentane, isopentane, neopentane or hexane. Preference is given to using a commercial pentane isomer mixture.

The further additives optionally present in the product are customary effective amounts of customary dyes, fillers, stabilizers, flame retardants, synergists, nucleating agents, lubricants and the like.

The expandable styrene polymer is in general present in the form of particles, ie. in bead form, granule form or in the form of chips, and advantageously has an average diameter of from 0.1 to 6 mm, in particular from 0.4 to 3 mm. It can be prepared for example by mixing the components in the melt in an extruder and cooling the extrudate sufficiently rapidly as to prevent foaming, and then comminuting it.

The suspension polymerization is advantageously carried out in a conventional manner. To this end, the styrene-acrylonitrile copolymer, which will usually be a commercial product, is dissolved in styrene, and this solution is polymerized in aqueous suspension. Advantageously, a small amount, about 0.005–0.05 mol-%, based on styrene, of a crosslinking agent is added to the polymerization. The blowing agent can be introduced before or in the course of the polymerization. It is also possible not to add it to the batch until after the polymerization has ended.

The beady expandable styrene polymer obtained is then separated from the aqueous phase, washed and dried.

In the Examples, parts are by weight.

EXAMPLE 1

In a pressure-resistant stirred vessel, a mixture of 200 parts of water and 0.1 part of sodium pyrophosphate, 100 parts of a solution of 0.01 part of divinylbenzene and 16.7 parts of a styrene-acrylonitrile copolymer (70/30% by weight) having a melt flow index (g/10 min) of 1.9 in 83.3 parts of styrene, 7 parts of pentane, 0.15 part of tert-butyl peroxide, 0.45 part of benzoyl peroxide and 4 parts of a 10% strength aqueous solution of polyvinylpyrrolidone was heated with stirring to 90° C., maintained at 90° C. for 5 hours and then heated at 100° C. for 2 hours and at 120° C. for a further 2 hours. After cooling down, the bead polymer obtained, which had an average particle diameter of about 1 mm, was separated from the aqueous phase, washed and dried.

The expandable styrene polymer obtained was prefoamed with flowing steam in a commercial stirred prefoamer, model Rauscher, to a bulk density of 20 g/l. After 24 hours' storage, the foam particles were welded together in a block form in a block mold, model Rauscher, under a pressure of 1.8 bar by exposure to steam.

To test the oil resistance, 5 samples of the foam in the form of a cube having an edge length of 5 cm were each stored in heating oil and diesel fuel for 72 hours in line with German Standard Specification DIN 53428. The assessment criteria applied were: 0=unchanged (resistant); 1=changed (somewhat resistant); 3=very deeply changed (nonresistant).

The results are summarized in the Table.

TABLE

| Example | (a) Polystyrene % by weight | (b) SAN copolymer % by weight | a + b AN content % by weight | Oil resistance Heating oil | Diesel fuel |
|---|---|---|---|---|---|
| 1 | 83.3 | 16.7 | 5 | 0 | 0 |
| 2 | 80 | 20 | 6 | 0 | 0 |
| 3 | 77 | 23 | 6.9 | 0 | 0 |
| 4 | 77 | 23 | 6.9 | 0 | 0 |
| 5 | 77 | 23 | 6.9 | 0 | 0 |
| 6 (comparison) | 91 | 9 | 2.7 | 1 | 1 |
| 7 (comparison) | 100 | — | 0 | 2 | 2 |

EXAMPLE 2

Example 1 was repeated using 100 parts of a solution of 0.01 part of divinylbenzene and 20 parts of the styrene-acrylonitrile copolymer in 80 parts of styrene.

EXAMPLE 3

Example 1 was repeated using 100 parts of a solution of 0.01 part of divinylbenzene and 23 parts of the styrene-acrylonitrile copolymer in 77 parts of styrene.

EXAMPLE 4

Example 1 was repeated, except that no divinylbenzene was used.

EXAMPLE 5 (comparison)

Example 1 was repeated using 100 parts of a solution of 9 parts of the styrene-acrylonitrile copolymer in 91 parts of styrene.

EXAMPLE 6 (comparison)

Example 1 was repeated using 100 parts of a solution of 0.01 part of divinylbenzene in styrene.

We claim:
1. An expandable styrene polymer of high oil resistance, containing
   (a) from 50 to 83% by weight of polystyrene,
   (b) from 17 to 50% by weight of a styrene-soluble styrene-acrylonitrile copolymer in which the level of acrylonitrile is not less than 5% by weight, based on the sum of (a) and (b),
   (c) from 3 to 10% by weight, based on the sum of (a) and (b), of a $C_3$–$C_6$-hydrocarbon as blowing agent, and optionally
   (d) customary additives in effective amounts.

2. An expandable styrene polymer as claimed in claim 1, wherein the polystyrene has been prepared using from 0.005 to 0.05 mol-% of a crosslinking agent.

3. A process for preparing an expandable styrene polymer as claimed in claim 1, which comprises dissolving the styrene-acrylonitrile copolymer in styrene, polymerizing in aqueous suspension, and adding the blowing agent during or after the polymerization.

* * * * *